Patented Oct. 20, 1931

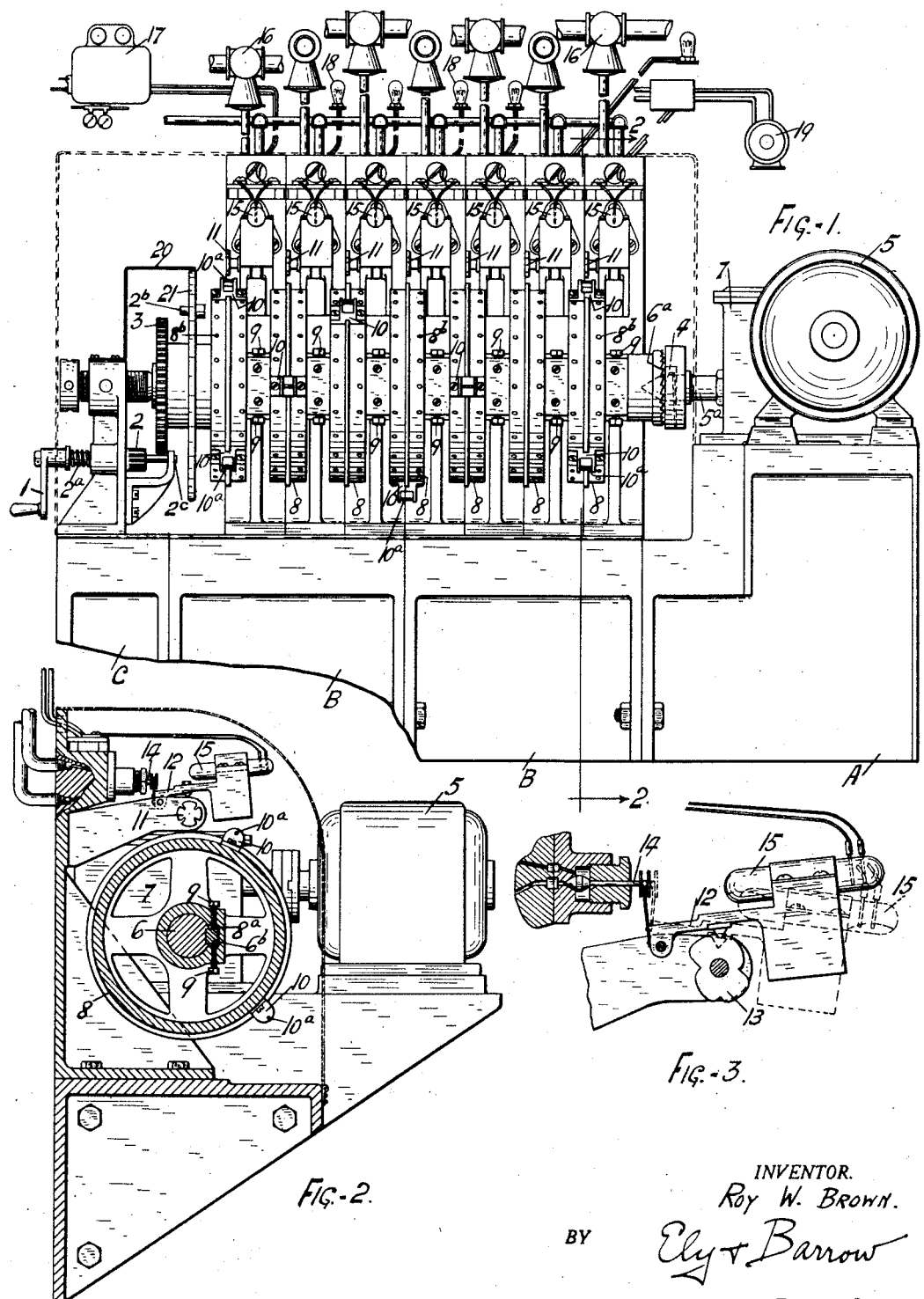

1,828,126

UNITED STATES PATENT OFFICE

ROY W. BROWN, OF AKRON, OHIO, ASSIGNOR TO THE FIRESTONE TIRE AND RUBBER COMPANY, OF AKRON, OHIO, A CORPORATION OF OHIO

TIME CONTROLLER

Application filed January 14, 1927. Serial No. 161,044.

This invention relates to time controllers adapted for use in controlling the opening and closing of valves in fluid pressure systems, and the opening and closing of circuits in electrical systems to control the operation of various devices throughout a predetermined sequence.

The general purpose of the invention is to provide an improved controller capable of automatically operating various types of apparatus such, for example, as vulcanizers, digestors, etc. throughout the entire process performed therein, opening and closing valves and establishing or breaking electrical circuits in any predetermined sequence.

Particularly the invention has for its object the provision of a controller including a plurality of similar control units adapted to be used in any number to produce any combination of functions in any desired sequence.

A further object is to provide an improved controller unit.

The foregoing and other objects are obtained by the construction illustrated in the accompanying drawings and described below. It is to be understood that the invention is not limited to the specific form thereof shown and described.

Of the accompanying drawings,

Figure 1 is an elevation of a controller embodying the invention;

Figure 2 is a section on line 2—2 of Figure 1; and

Figure 3 is an enlarged detail of the control lever.

Referring to the drawings, the numeral 5 indicates a motor, preferably of the synchronous type, controlled by conventional clock mechanism (not shown) and supported on a separate frame member A to provide a power unit. Motor 5 is arranged to drive a shaft $5^a$ through suitable reduction gearing at 7. Shaft $5^a$ carries a spring pressed pawl device 4 arranged to engage a ratchet $6^a$ on the main control shaft 6 to drive said shaft in one direction only.

Shaft 6 is of suitable length to drive any number of control units and has a longitudinal key $6^b$ thereon.

Each control unit includes a wheel 8 adjustably keyed thereon by having a keyway $8^a$ therein wider than key $6^b$ and set screws 9, 9 extending in from opposite sides of the keyway to adjust wheels 8 angularly on shaft 6. Each wheel 8 has a circumferential series of equally spaced bolt holes $8^b$, $8^b$ in its periphery, the spacing of the bolt holes being equal to or less than the range of angular adjustment of the wheel periphery. Bolt holes $8^b$ provide means whereby control lugs 10, 10 may be secured on the wheels 8, the lugs 10 accordingly being capable of adjustment to any angular position about shaft 6. Lugs 10 are bifurcated and carry cross rods $10^a$ arranged to engage and rotate star wheels 11 through a definite angle herein shown to rotate a quarter turn. For starting and stopping a mechanism or opening and closing a valve only once during each cycle two lugs 10 will be employed. If these operations are to be performed a number of times during each cycle, additional lugs 10 may be employed.

Rotatively connected with star wheels 11 are cams 13 so formed and arranged so as alternately to raise and lower a lever 12 connected to a fluid pressure valve 14 and carrying thereon a mercury contact switch 15 arranged to open or close a circuit as the valve 14 is operated. Valves 14 may, for example, be operated to control the supply of fluid under pressure to diaphragm valves 16 at the same time lighting or extinguishing a signal light 18 or starting or stopping a time temperature controller 17 or a motor 19 or either of the fluid pressure or electrical controls may be used alone.

The number of wheels 8 employed will depend upon the operations to be performed, sets of the control units being mounted on separate supports B, B adapted to be bolted to each other and to support A.

For setting or resetting of the controller an additional unit mounted on a support C may be provided, a setting gear 2 being shiftable into mesh with a gear 3 on shaft 6 against the action of a spring $2^a$ and being operable by a crank 1 to rotate shaft 6 to any predetermined angular position indicated by a fixed pointer 20 on a dial 21 mounted on shaft 6. During the setting operation stop pin 2^b mounted on dial 21 engages shaft extension 2^c of gear 2 and stops rotation of dial 21, gear 3, gear 2 and crank 1 at the correct position. Releasing crank 1 permits spring 2^a to retract gear 2 and disengage extension 2^c from stop pin 2^b thus permitting rotation of shaft 6 by motor 5.

In use in the preferred manner, the controller is first set to proper initial angular position by crank 1, star wheels 11 being also set to proper initial positions. The motor 5 is synchronously driven at the desired rate, the lugs 10 being adjusted to proper relative angular positions actuating star wheels 11 to operate valves 14 and switches 15 in the desired sequence, the lights 18 preferably being switched on when the corresponding valve is open and off when it is shut and the time temperature controller 17, motor 19 or other devices (not shown) being operated during the required periods of the cycle. The controller may be arranged to stop itself.

It will be apparent from the foregoing that an effective controller has been provided and one which is capable of easy and inexpensive manufacture and assembly to produce any desired cycle of control of any combination of devices. It will also be apparent that modifications of the invention may be resorted to without departing from the spirit thereof or the scope of the appended claims.

What is claimed is:

1. A time controller including a time-controlled shaft, one or more wheels having a circumferential series of securing means equally spaced on their outer peripheries and mounted on the shaft, lugs secured on the wheels by certain of said means, means for angularly adjusting the wheels on the shaft over a range at least as great as the spacing of the securing means, means for driving the shaft in one direction only, means for setting of the shaft in any desired initial angular position, one or more star wheels arranged to be engaged by the lugs, one or more cams adapted to be rotated by the star wheels, one or more levers operable by the cams, and one or more fluid pressure control valves operable by the levers.

2. A time controller including a time-controlled shaft, one or more wheels mounted on the shaft, lugs secured on the wheels, means for driving the shaft in one direction only, means for setting of the shaft in any desired initial angular position, one or more star wheels arranged to be engaged by the lugs, one or more cams adapted to be rotated by the star wheels, one or more levers operable by the cams, and one or more fluid pressure control valves operable by the levers.

3. A time controller including a time-controlled shaft, one or more wheels having a circumferential series of securing means equally spaced on their outer peripheries and mounted on the shaft, lugs secured on the wheels by certain of said means, means for angularly adjusting the wheels on the shaft over a range at least as great as the spacing of the securing means, means for driving the shaft, one or more star wheels arranged to be engaged by the lugs, one or more cams adapted to be rotated by the star wheels, one or more levers operable by the cams, and one or more fluid pressure control valves operable by the levers.

4. A time controller including a time-controlled shaft, one or more wheels mounted on the shaft, lugs secured on the wheels, means for driving the shaft, one or more star wheels arranged to be engaged by the lugs, one or more cams adapted to be rotated by the star wheels, one or more levers operable by the cams, and one or more fluid pressure control valves operable by the levers.

ROY W. BROWN.